(12) United States Patent
Huovila et al.

(10) Patent No.: US 10,627,013 B2
(45) Date of Patent: Apr. 21, 2020

(54) UNIVERSAL GRIPPER

(71) Applicants: Janne Huovila, Espoo (FI); Jörgen Johansson, Vanda (FI); Kim Rinamo, Espoo (FI)

(72) Inventors: Janne Huovila, Espoo (FI); Jörgen Johansson, Vanda (FI)

( * ) Notice: Subject to any disclaimer, the term of this patent is extended or adjusted under 35 U.S.C. 154(b) by 0 days.

(21) Appl. No.: 16/091,546

(22) PCT Filed: Apr. 7, 2016

(86) PCT No.: PCT/FI2016/050216
§ 371 (c)(1),
(2) Date: Oct. 5, 2018

(87) PCT Pub. No.: WO2017/174856
PCT Pub. Date: Oct. 12, 2017

(65) Prior Publication Data
US 2019/0120407 A1    Apr. 25, 2019

(51) Int. Cl.
| | |
|---|---|
| *F16L 3/10* | (2006.01) |
| *B62J 11/00* | (2020.01) |
| *F16B 2/10* | (2006.01) |
| *B62B 5/00* | (2006.01) |
| *F16M 11/04* | (2006.01) |
| *A61G 5/00* | (2006.01) |
| *B60P 1/00* | (2006.01) |

(Continued)

(52) U.S. Cl.
CPC .............. *F16L 3/1075* (2013.01); *A61G 5/00* (2013.01); *B60P 1/00* (2013.01); *B60P 7/08* (2013.01); *B62B 5/0016* (2013.01); *B62J 11/00* (2013.01); *F16B 2/10* (2013.01); *F16L 3/1066* (2013.01); *F16M 11/041* (2013.01); *F16M 13/02* (2013.01); *B62B 2207/02* (2013.01)

(58) Field of Classification Search
CPC combination set(s) only.
See application file for complete search history.

(56) References Cited

U.S. PATENT DOCUMENTS

| | | | | |
|---|---|---|---|---|
| 2,299,837 A | * | 10/1942 | Mayer | B60N 3/12 248/218.4 |
| 3,913,187 A | * | 10/1975 | Okuda | F16L 3/1075 24/484 |

(Continued)

FOREIGN PATENT DOCUMENTS

| | | |
|---|---|---|
| EP | 0656501 A2 | 6/1995 |
| EP | 2719933 A1 | 4/2014 |

(Continued)

*Primary Examiner* — Monica E Millner
(74) *Attorney, Agent, or Firm* — Laine IP Oy

(57) ABSTRACT

According to an example aspect of the present invention, there is provided A gripper comprising a body (1), the body (1) comprising an attachment (12) to a holding body. There is provided a first gripping jaw (2) extending from the body (1) and comprising a concave groove having has two longitudinal opposite edges (4, 5); at least one second gripping jaw (7) having a second concave groove with two longitudinal edges, at least one longitudinal edge of the second longitudinal groove being attached to one edge (5) of the first longitudinal groove either pivotably or detachably; and at least one closing element (10, 11) for pressing the second gripping jaw (7) towards the first gripping jaw (2).

16 Claims, 5 Drawing Sheets

(51) Int. Cl.
*B60P 7/08* (2006.01)
*F16M 13/02* (2006.01)

(56) References Cited

U.S. PATENT DOCUMENTS

| | | | | |
|---|---|---|---|---|
| 4,382,570 A * | 5/1983 | Craig | ............... | F16L 3/1008 |
| | | | | 24/270 |
| 4,953,819 A * | 9/1990 | Davis | ............... | A61M 5/1415 |
| | | | | 211/107 |
| 5,334,119 A * | 8/1994 | Eloranta | ............... | A63K 3/046 |
| | | | | 482/16 |
| 6,164,604 A * | 12/2000 | Cirino | ............... | F16L 3/1075 |
| | | | | 248/74.3 |
| 6,209,827 B1 * | 4/2001 | Kawai | ............... | F16B 21/02 |
| | | | | 248/49 |
| 6,601,802 B1 * | 8/2003 | Howe | ............... | F16L 3/14 |
| | | | | 248/58 |
| 7,261,263 B2 * | 8/2007 | Baker | ............... | A47F 5/04 |
| | | | | 24/24 |
| 7,712,708 B2 * | 5/2010 | Clark | ............... | B60R 16/0215 |
| | | | | 24/115 R |
| 8,020,810 B2 * | 9/2011 | Dietrich | ............... | F16L 3/1025 |
| | | | | 248/63 |
| 8,294,583 B2 * | 10/2012 | Sayegh | ............... | E05B 73/0017 |
| | | | | 24/16 PB |
| 9,480,367 B2 * | 11/2016 | Reed | ............... | A47K 17/022 |
| 2005/0000062 A1 * | 1/2005 | Lin | ............... | F16L 23/10 |
| | | | | 24/279 |
| 2008/0245933 A1 * | 10/2008 | Stokes | ............... | F16B 2/10 |
| | | | | 248/74.1 |
| 2009/0266945 A1 | 10/2009 | Dietrich et al. | | |
| 2014/0103172 A1 * | 4/2014 | Tazioli | ............... | F16L 3/1066 |
| | | | | 248/74.4 |

FOREIGN PATENT DOCUMENTS

| | | |
|---|---|---|
| FR | 2144138 A5 | 2/1973 |
| JP | 2012225503 A | 11/2015 |
| KR | 20090007325 U | 7/2009 |

\* cited by examiner

UNIVERSAL GRIPPER

FIELD

The invention relates to a universal gripper for handling and gripping longitudinal objects such as tubes, pipes or beams. One special adaptation is locking two objects together permanently or releasably. One specific adaptation is to attach a pram to a shopping cart.

BACKGROUND

Various longitudinal objects are handled for example in manufacturing industry, building sites and in gas and oil producing industry. The diameter and overall size of the objects vary and quite often the objects are rather long and heavy like support beams and pillars, oil or gas pipes and drill bodies. These objects are handled by cranes or hoist equipped with suitable grippers. Excavators or other machines provided with articulated beams can be also equipped with grippers for handling various objects. One advantage of machined having articulated solid beams over hoist or cranes operating with support cables is superior ability to move objects in three dimensional space, to rotate the objects and better ability to position objects accurately since the object to be transferred is supported by a rigid beam system.

Bicycles, motorbikes, carts or furniture have tubular elements that can be used for mounting points for accessories or attachments for joining such devices to other devices of similar nature. For mounting and coupling can be used clamps, couplers or grippers of various kinds. Some such devised have been presented in documents WO2007109187, U.S. Pat. Nos. 5,507,541, 5,375,861, US 20100133309, US 20070205242 and GB 919417. Known devices are usually designed for specific use and are thereby limited to that specific use.

SUMMARY OF THE INVENTION

The invention is defined by the features of the independent claims. Some specific embodiments are defined in the dependent claims.

According to a first aspect of the present invention, there is provided a gripper having a body, the body comprising an attachment to a holding body and a first gripping jaw extending from the body and comprising a concave groove. The groove has two longitudinal opposite edges. A second gripping jaw has a second concave groove with two longitudinal edges. At least one longitudinal edge of the second longitudinal groove is attached to one edge of the first longitudinal groove either pivotably or detachably. The gripper further comprises at least one closing element for pressing the second gripping jaw towards the first gripping element.

According to a second aspect of the invention the gripper comprises at least two second gripping jaws having a second concave groove with two longitudinal edges, wherein the proximal longitudinal edges of the second longitudinal grooves are attached to each other either pivotably or detachably.

According to a third aspect of the present invention, there is provided a gripper, wherein the distance between the longitudinal edges of the second gripping jaw is smaller than the distance between the longitudinal edges of the first gripping jaw.

According to a fourth aspect of the present invention, there is provided a gripper, wherein the cross section of the groove in at least one of the gripping jaws is same over the length of the gripping jaw between the longitudinal edges.

According to a fifth aspect of the present invention, there is provided a gripper, wherein the cross section of the groves is a semicircle.

According to a sixth aspect of the present invention, there is provided a gripper, wherein the cross section of the groves is a semicircle and the diameter of the cross section of the groove of the second gripping jaw is smaller than the diameter of the cross section of the groove of the first gripping jaw.

According to a seventh aspect of the present invention, there is provided a gripper, wherein the attachment comprises at least one bolt for attachment to a holding body.

According to an eighth aspect of the present invention, there is provided a gripper, wherein the attachment comprises a mounting elements of for attaching the gripper to a coupler of an articulated boom, such as an excavator boom.

According to a ninth aspect of the present invention, there is provided a gripper, wherein the attachment comprises mounting elements of for attaching the gripper to a coupler of a crane.

According to a tenth aspect of the invention the gripper comprises an attachment for attaching the gripper to a wire frame of a shopping cart and the grooves being dimensioned for gripping a handle of a pram.

EMBODIMENTS

Definitions

In the present context, the term "holding body" comprises a movable or stationary element to which the gripper can be mounted by its attaching means.

The definition "holding body" includes mounting elements of articulated booms, excavators, hoists and cranes, movable vehicles or carts or solid structures.

The invention provides a gripper that can be adapted to several purposes for gripping and holding longitudinal objects either for attaching two objects together or for moving longitudinal objects such as a tubes, pipes, pillars or posts. The gripper comprises a first jaw fixed to a body and the body comprises attaching elements for fixing the gripper to a desired kind of a manipulator or a fixing point. One or more second jaws are attached to the first jaw so that it can be turned in relation to the first jaw or detachably attached to it in order to open the gripper. The gripper is also provided with closing element for locking the second jaw over a longitudinal object placed between the jaws. Both jaws have a concave groove for accommodating the longitudinal object that is gripped.

Figure 1:
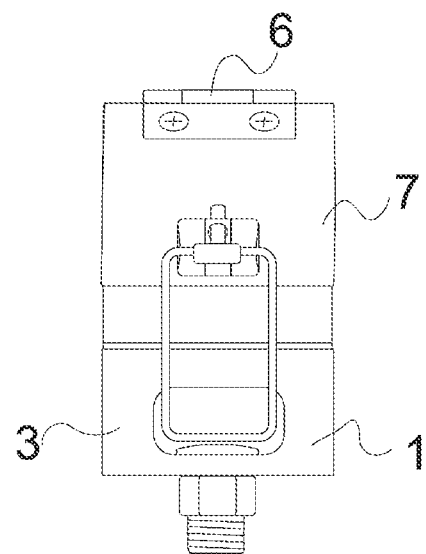
FIGS. 1-3 illustrate a gripper in accordance with at least some embodiments of the present invention in three different views.
Figure 2:
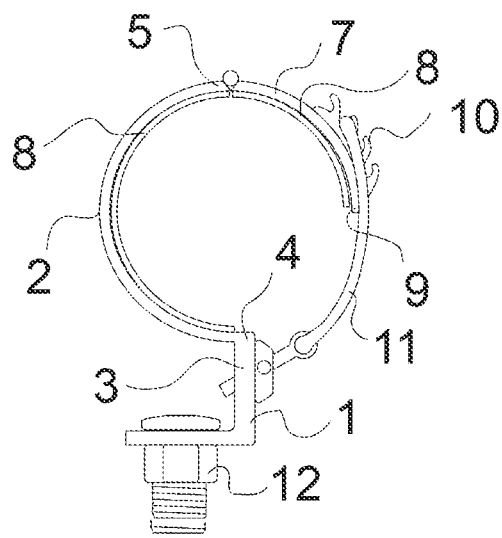
Figure 3:
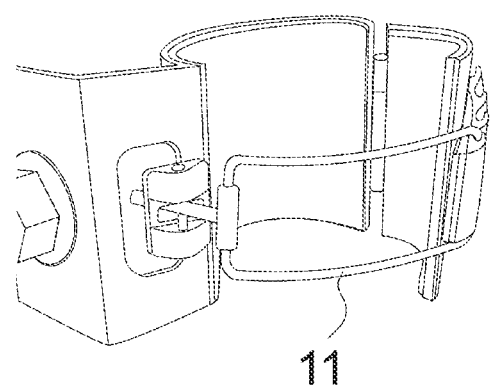

FIG. 1 illustrates in a side view a gripper in accordance with at least some embodiments of the present invention, FIG. 2 is an end view and FIG. 3 is an illustrative view. The body 1 of the gripper is an L-shaped profile and the first gripping jaw 2 extends from the edge of one flange 3 of the body 1. The first jaw 2 has a semi-circular cross section with first longitudinal edge that joins to the flange 3 of the body and a second, opposite longitudinal edge 5 that is parallel to the edge joining the flange. The distance between the edges defines the dimensions of the objects that can be gripped with the gripper. At the second longitudinal edge 5 is a hinge 6. The hinge 6 can be any pivotal joint or element capable of joining two pieces together so that they can be pivoted or turned in relation to each other. A second jaw 7 is joined to the second longitudinal edge 5 by the hinge 6 so that the first edge of the second jaw 7 runs parallel and adjacent to the second edge 5 of the first jaw 2. In this embodiment the second jaw forms a section of a circle and extends only partially over the gap between the first 4 and second 5 edge of the first jaw. The radius of cross sectional profile of the section of a circle of second jaw 7 is in this embodiment smaller than the radius of the cross section of the first jaw. The second jaw 7 doesn't extend over the gap between the edges of the first jaw whereby a gap is provided over groove of the first jaw 2. Both of the jaws 2, 7 have a padding 8 on their concave inner surfaces for enhancing the grip and preventing damage on the objects to be gripped.

The gripper comprises a closing element. In this embodiment the closing element comprises locking teeth 10 mounted on the second jaw 7 (FIGS. 2 and 3). The locking teeth 10 comprise four tooth distanced from each other over the top or convex surface of the second jaw 7. On the body 1 of the gripper is pivotally attached a locking loop 11 made of steel wire. The locking element or mechanism is operated by pressing the second jaw 7 over an object placed between the first and second jaw. Then the locking loop 11 is pushed over the top of a locking tooth it naturally engages. When pressure on the second jaw 7 and the locking loop is released, the second jaw and the object between the jaws are locked in place and the object is gripped in the gripper. The closing element may be positioned in an alternative way as seen in FIG. 1. Now the locking loop is attached to a second jaw and locking teeth are attached to the body or 1 or the first jaw 2. This type of mounting may provide easier operation in some uses. The locking loop 11 and its attachment to the gripper provide two joints that allow rotation around the longitudinal axis of the gripper. This facilitates accommodation of the gripper to different shapes that are gripped.

Figure 4:
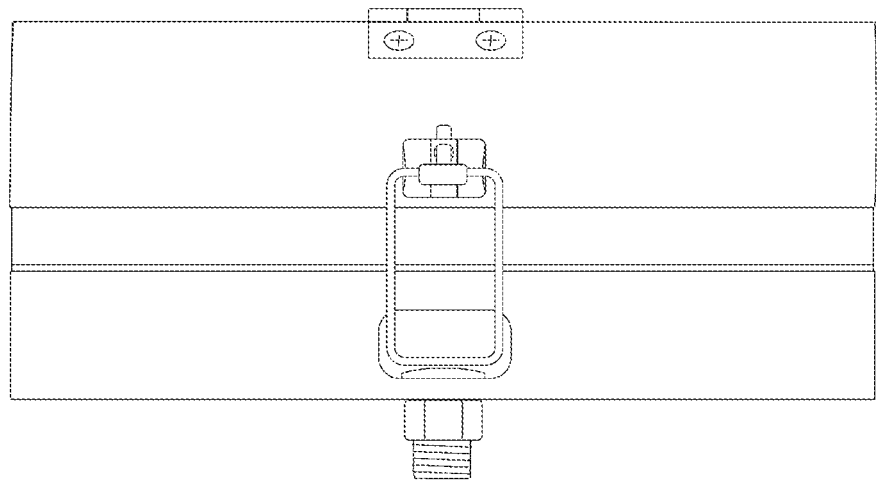
FIGS. 4 and 5 illustrate an example apparatus capable of supporting at least some embodiments of the present invention.
Figure 5:
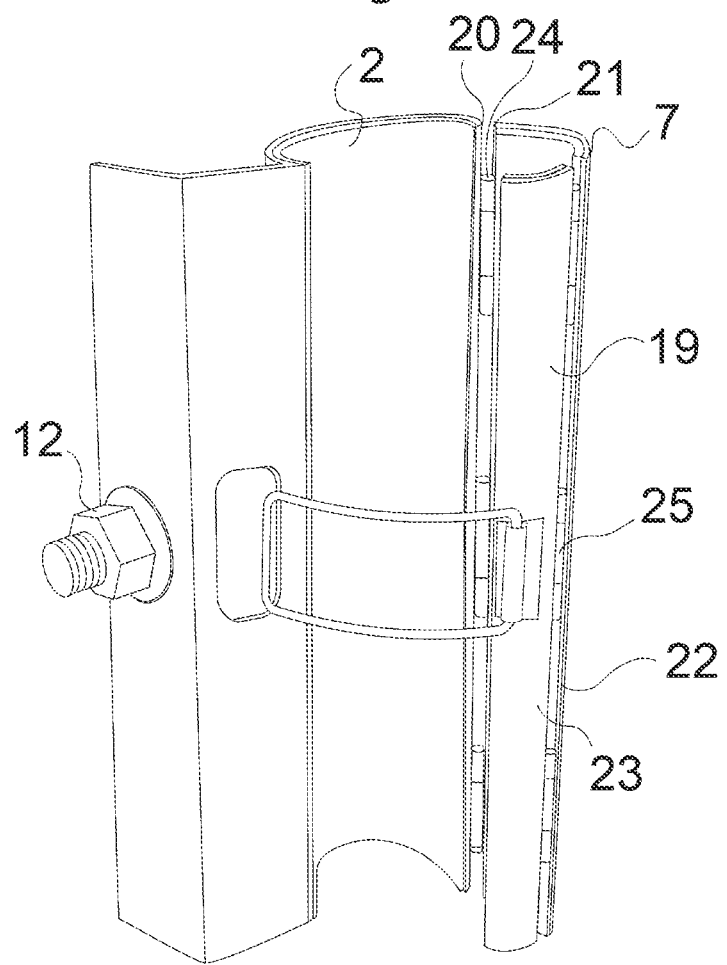

The attaching element in here is a single bolt and nut 12. The bolt and nut 12 attachment enables attachment of the gripper in any angular position 360° around the bolt. This attachment is simple to mount and operate and can be used in large scale of purposes. FIGS. 4 and 5 illustrate an example apparatus capable of supporting at least some embodiments of the present invention. This apparatus has longitudinally extended jaws 2, 1and 19. Extended jaws 2, 7 and 19 provide more support for moment loads crosswise the longitudinal axis of the jaws. Instead of two gripping jaws described above, the gripper may comprise two or more second jaws. Preferred number is two as greater number increases the complicity of the gripper. The purpose of increasing the number of the second jaws is to provide further flexibility in use and further ability to accommodate objects of different shapes. The gripper comprising at least two second gripping jaws 7, 19 having a second concave groove with two longitudinal edges, wherein the proximal longitudinal edges of first and second jaws 20, 21 and 22, 23 of the longitudinal grooves are attached to each other either pivotably by hinges 24, 25. Alternatively the gripping jaws may be joined detachably but then the use of the gripper may be slower. For some objects the detachability may be needed for enabling the closure of the gripper around the object to be handled.

Figure 6:
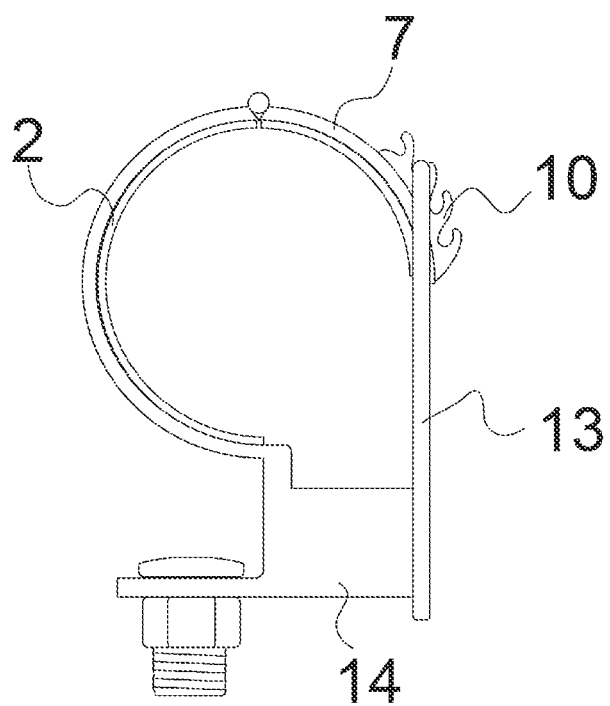
FIGS. 6, 7 and 8 illustrate an example apparatuses capable of supporting at least some embodiments of the present invention.
Figure 7:
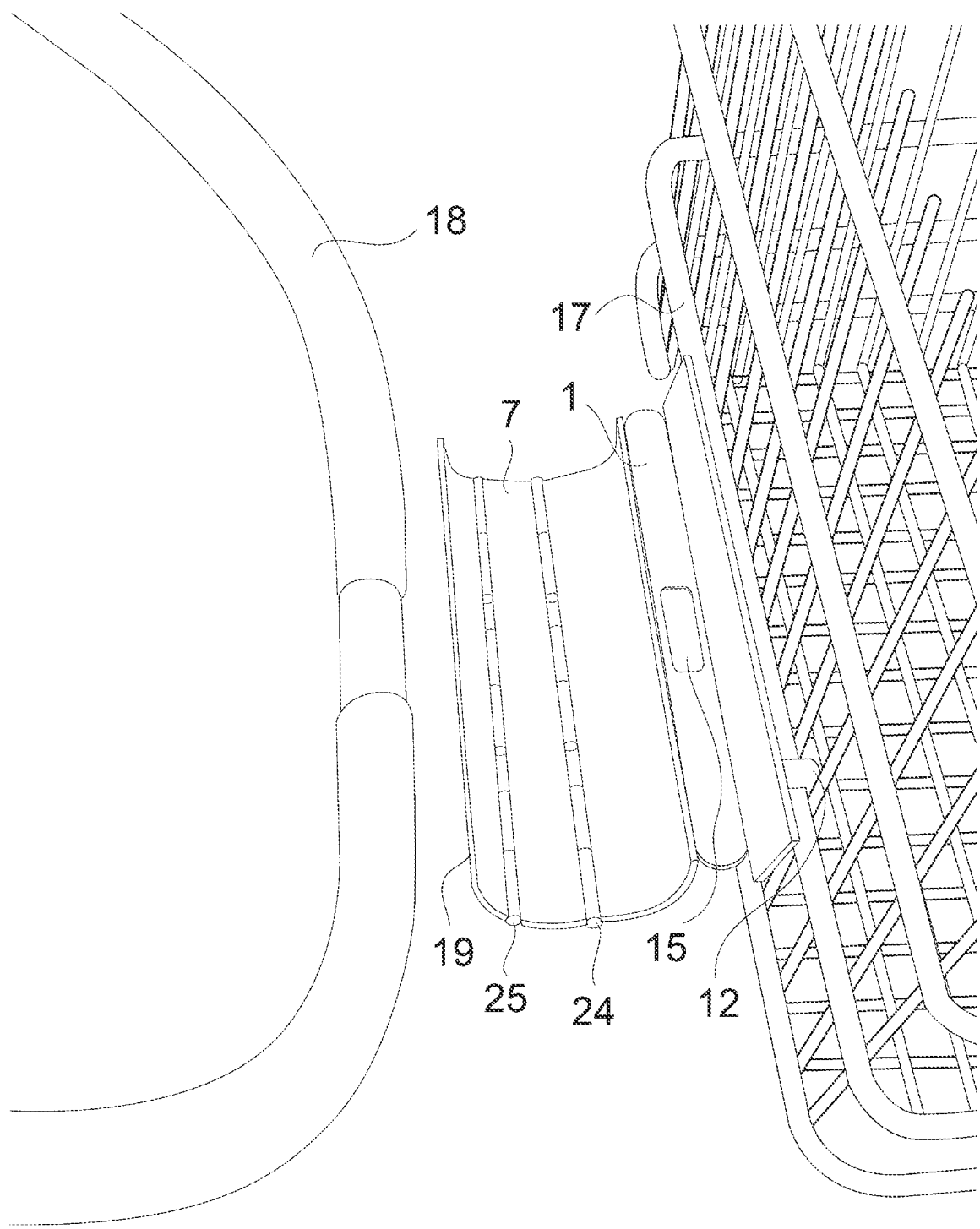
Figure 8:
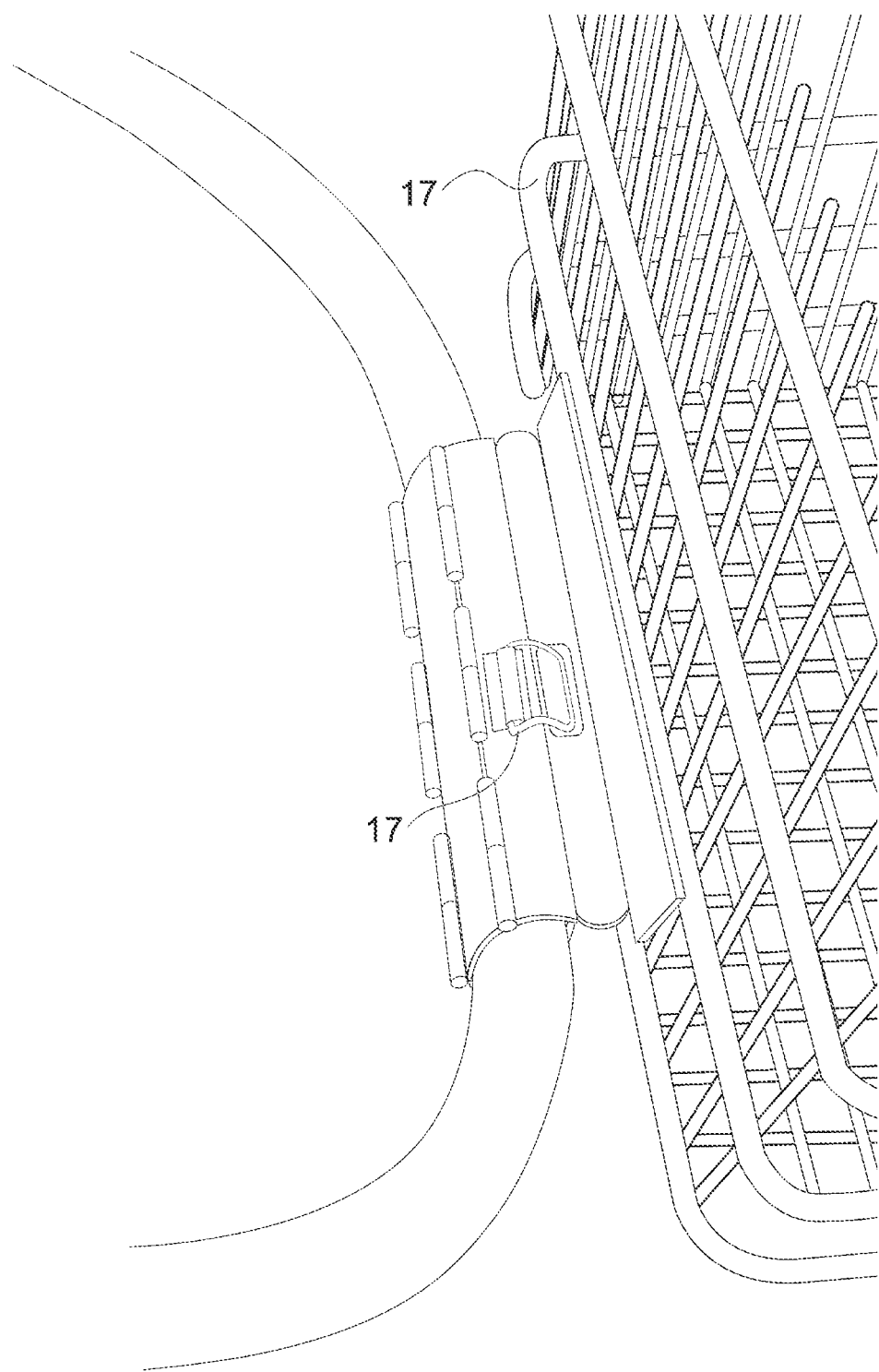

FIG. 6 illustrates an apparatus further capable of supporting some embodiments of the present invention. In this apparatus the locking mechanism comprises a locking bar (or a flat strip) 13 extending from the second edge of the second jaw 7 over the opening of the groove of the first jaw and on top of the body 1. On the body 1 is arranged an electric magnet 14. In this apparatus locking and releasing the second jaw is operated by the electric magnet that provides simple and secure locking mechanism. The bar can be made adjustable so that is comprises loop or hole that can be set over the teeth 10 of the second jaw 7 or it can be made solid as a fixed part of the second jaw. Adjustment for different sizes of objects can be made by compression springs or other adjustable or flexible elements. Of course a sufficient gripping power has to be provided in order to secure the grip on the object to be gripped. FIGS. 7 and 8 illustrate an apparatus for attaching a shopping cart to a pram capable of supporting some embodiments of the invention. The apparatus is otherwise similar to the apparatuses described above, but includes two bolts 12 for attaching the gripper to the wire mesh 17 of a shopping cart. The closing element comprises a permanent magnet 15. A agent provised easy operation of the gripper and yet realiable closure. FIG. 8 shows an alternative closing element. This element is similar to the one described in FIGS. 1 to 5 and allows also fast and easy operation as well as secure grip. Herein the object to be gripped is a pushing handle 18 of a pram.

an other alternative for closure is to use two bolts and nuts mounted on the ends of the gripper body 1 and two brackets at the distal ends of the second jaw 7. The brackets are designed to co-operate with bolts for adjustable closing of eh second jaw 7 over the first jaw 1. The adjustment can be done simply by turning the bolts. When brackets are pushed over the bolts, turning of the nuts on the bolts presses the brackets towards the gripper body 1. The second jaw 7 is consequently pressed against any object placed between the jaws 1, 7 and the object can be held tightly between the jaws 1, 7. This locking alternative is suitable for purposes where high gripping forces are needed but fast closure is not essential.

The apparatus of FIGS. 7 and 8 is to combine a shopping cart to a pram so that they can be pushed and manoeuvred easily together. The gripper provides a solid attachment that enables easy steerage of the pram. A shopping cart has usually four wheels that can freely rotate around their axis. This allows the cart to be pushed to any direction desired. Consequently the cart can be easily turned in relation to the pram and the gripper allows the pram to be steered by the cart to any desired direction even in narrow and close spaces.

The pram is attached from its pushing handle to the front of the basket part of the shopping cart. Depending on the material of the basket the gripper is attached to a front wall or a front griddle or wire mesh of a shopping cart. The gripper according to the invention can be mounted inside a bus or other vehicle at a place provided for prams, for example at a middle door. The gripper can be used for locking a pram securely to the vehicle in order to prevent toppling of the pram or any other uncontrolled movement. The gripper can be used in any vehicle for public or private transport. The dimensions of the gripper can be, for example 10-500 mm in length measured along the edges of the grooved jaws. The gripper can be made of metal, plastic, carbon fibre or cloth and eh inner surface of the jaws can be padded with different materials. The closing element or a locking mechanism can be any quickly operable locking mechanism, for example a snap lock used in slalom shoes. The upper part (second jaw 7) can be turned around a hinge or any axis or joint allowing a rotating movement.

The gripper may include features not shown in figures. For example, the gripper or one or both of the jaws can be divided to two or more parts that can be independently operated by a fast locking mechanism related each of the parts. The gripper or parts can be movable around a joint either 360° or less. This action is not shown in the figures. The hinges shown in the figures can be unaltered regardless whether the gripper is made of one or two parts or turnable 360° or less. The size of the gripper can be altered and it may comprise one or more hinges.

The gripper can be used in pram industry as a additional package space that can be sold separately. The gripper can be also used in pram storage spaces for locking a pram on a wall in upright position. The gripper can further be used in pram parks for locking the prams in order to prevent stealing.

One use of the gripper is in any industry involving handling large or small longitudinal objects such as pipes, tubes or pillars. They can be gripped by a suitable dimensioned gripper according to the invention. The gripper can be mounted on any machine used for manipulating or transport of such objects. For example, the gripper can be mounted on an articulated boom of an excavator, logging machine or any machine that can move the end of a boom in a three dimensional space. Such a combination of the gripper according to the invention allows easy handling of heavy and large longitudinal objects as well as smaller ones.

The profiles of the grooves can vary. A circular cross section shown above is easy to manufacture and inherently accommodates various shapes of objects to be gripped. In one preferred embodiment the cross section of the groove of the second jaw is smaller than that of the first jaw and the width of eh second jaw is also smaller. Either of these features can be used separately or in combination. The purpose of this design is to provide ability to grip object having other that circular cross section. If the jaws 1, 7 are designed like this, they have slightly different gripping surface and by this way accommodate different shapes of objects. Also, if the second jaw is slightly or more smaller or narrower that the first jaw, it allows greater length of movement as the second jaw does not touch he body of the gripper. Further, the gripper can be positioned around and object to be gripped more easily.

The closing or locking mechanism of the jaws can be manually operated as described above or any electric, hydraulic of pneumatic device capable of closing the jaws towards each other. The turning of the second jaw can be accomplished manually or the second jaw can be provided with a electric motor, hydraulic cylinder or any common operating device used in machine design. The hinge of the gripper can alternatively be an openable mechanism allowing detachment of the second jaw from the gripper and attaching it back in order to lock an object to be gripped between the jaws. Such a mechanism can be operated manually, electromagnetically, electrically, pneumatically or hydraulically. One preferable locking mechanism might be an electric magnet described above. Other locking means include handcuff like ratchet lock, stepless locking systems an similar.

The material of the gripper is metal, plastic, carbon fibre, composite, cloth, rubber or similar. The size of the gripper can be dimensioned according to the intended use so that the gripper may accommodate either very large objects of small ones. The attachment may comprise a joint that is turnable 360° around an axle or a ball joint, the joint being preferably lockable so that the griper can be secured into a desired position. Such mechanisms can be found form dial rings of watches, for example in diving watches. The gripper may comprise a lock for securing the jaws against unauthorized opening. This enables the use of the gripper for preventing stealing of luggage or other equipment in public spaces such as public vehicles or waiting rooms. The gripper may be used for attaching a pram, wheel chair, luggage or other transporting equipment to a vehicle, preferably to a vehicle used for public transport or for attaching transporting equipment such as a pram to a wall of a bicycle storage room.

The shape of the grooves of the jaws may vary, for example the cross section may comprise a part of an oval, V-, U-shape or any shape formed of straight walls joined angularly together. The inner surface of the grooves may include padding or shaped parts for obtaining a secure grip or to prevent damage to the object to be gripped. Such an insert may be made of plastic, leather, rubber, foamed rubber or plastic or it may include even steel teeth if a powerful grip is desired.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In this description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in gas and oil industry, building industry and consumer products.

The invention claimed is:

1. A gripper comprising:
a body, the body comprising an attachment configured to attach the body to a holding body;
a first gripping jaw extending from the body and comprising a concave groove having two longitudinal opposite edges;
at least one second and one third gripping jaw, having second and third concave grooves respectively, the second and third concave grooves each having two longitudinal edges, wherein the proximal longitudinal edges of the first and second concave grooves are attached to each other either pivotably or detachably and the proximal longitudinal edges of the second and third concave grooves are attached to each other either pivotably or detachably; and
at least one closing element for pressing the second gripping jaw towards the first gripping jaw, the closing element including an apparatus operable electrically, electromagnetically, mechanically, pneumatically or hydraulically,
wherein the distance between the longitudinal edges of the second gripping jaw is smaller than the distance between the longitudinal edges of the first gripping jaw.

2. The gripper according to claim 1, wherein the cross section of the groove in at least one of the gripping jaws is constant over the length of the gripping jaw and between the longitudinal edges.

3. The gripper according to the claim 2, wherein the cross section of the grooves is chosen from a group wherein the cross section comprises a part of an oval, V-, U-shape or any shape formed of straight walls joined angularly together or a semicircle.

4. The gripper according to the claim 3, wherein the cross section of the grooves is a semicircle and the diameter of the cross section of the groove of the second gripping jaw is smaller than the diameter of the cross section of the first gripping jaw.

5. The gripper according to claim 1, wherein the attachment comprises at least one bolt for attachment to a holding body.

6. The gripper according to claim 1, wherein the attachment comprises mounting elements for attaching the gripper to a coupler of an articulated boom, such as an excavator boom, to a coupler of a crane, a coupler of tractor or other working machine.

7. The gripper according to claim 1, comprising an attachment for attaching the gripper to a frame of a shopping cart.

8. The gripper according to claim 1, wherein the material of the gripper is metal, plastic, carbon fiber, composite, cloth, or rubber.

9. The gripper according to claim 1 wherein the gripper is configured for attaching a pram, wheel chair, luggage or other transporting equipment to a vehicle.

10. The gripper according to claim 1 wherein the gripper is configured for attaching transporting equipment to a wall of a bicycle storage room.

11. The gripper according to the claim 1, wherein the distance between the longitudinal edges of the second gripping jaw is smaller than the distance between the longitudinal edges of the first gripping jaw.

12. The gripper according to claim 1, wherein the cross section of the groove in at least one of the gripping jaws is same over the length of the gripping jaw and between the longitudinal edges.

13. The gripper according to claim 1, wherein the cross section of the groove in at least one of the gripping jaws is same over the length of the gripping jaw and between the longitudinal edges.

14. The gripper according to claim 1, wherein the attachment comprises at least one bolt for attachment to a holding body.

15. The gripper according to claim 1, wherein the attachment comprises at least one bolt for attachment to a holding body.

16. The gripper according to claim 1, wherein the grooves are dimensioned for gripping a handle of a pram.

* * * * *